United States Patent

[11] 3,607,107

[72] Inventor Arnold L. Ayers
     Convent Station, N.J.
[21] Appl. No. 777,933
[22] Filed Sept. 4, 1968
     Continuation-in-part of Ser. No. 718,175,
     Apr. 2, 1968, abandoned
[45] Patented Sept. 21, 1971
[73] Assignee Allied Chemical Corporation
     New York, N.Y.

[54] PLURAL SPENT-REACTOR-FUEL DISSOLVERS HAVING SELECTIVE FEED MEANS
     10 Claims, 2 Drawing Figs.
[52] U.S. Cl. .................................................. 23/272.5,
                        23/272.6, 222/463, 222/488
[51] Int. Cl. .................................................. B01d 11/02
[50] Field of Search .................................... 23/267,
                        272, 272.5, 272.6, 312; 222/463, 488, 410

[56] References Cited
     UNITED STATES PATENTS

| | | | |
|---|---|---|---|
| 953,073 | 3/1910 | Trillich | 23/272.6 X |
| 1,319,661 | 10/1919 | Tone | 23/272.6 X |
| 1,354,747 | 10/1920 | Hiller | 222/488 X |
| 1,794,874 | 3/1931 | Trescott | 23/272.6 |
| 1,824,424 | 9/1931 | Buss | 23/272.5 |
| 1,942,848 | 1/1934 | Taylor | 23/272.6 X |
| 2,189,018 | 2/1940 | Robinson | 222/410 X |
| 2,307,798 | 1/1943 | Kook | 222/488 X |
| 2,334,181 | 11/1943 | Elston | 222/488 X |
| 2,620,946 | 12/1952 | Auer | 222/488 X |
| 3,423,292 | 1/1969 | Nichols | 23/272.6 X |

FOREIGN PATENTS

| | | | |
|---|---|---|---|
| 534,697 | 9/1931 | Germany | 23/272.6 |

Primary Examiner—Norman Yudkoff
Assistant Examiner—S. J. Emery
Attorney—Jay P. Friedenson ABSTRACT: A novel process for the dissolution of spent nuclear reactor fuel, while simultaneously controlling the amount of volatile off-gases evolved during the dissolution, comprises the steps of (a) passing spent nuclear reactor fuel, in regulated amounts, through a dissolvent solution, (b) continuously withdrawing the volatile off-gases which are evolved, (c) withdrawing a portion of the solution of spent nuclear reactor fuel when a predetermined maximum concentration of fuel values is reached in the solution, (d) adding a compensating volume of dissolvent solution while step (c) is being carried out, (e) continuously recirculating the remaining portion of the solution of spent nuclear reactor fuel to the dissolution step, (f) discontinuing steps (c) and (d) when a predetermined minimum concentration of fuel values is reached in the solution, and (g) repeating steps (c)-(f) as the predetermined maximum and minimum fuel values are repeatedly obtained in the solution. In a preferred mode of operation two dissolver systems are employed and fuel to be dissolved is fed to one dissolver system while the other dissolver system is being washed, discharged and readied for another dissolution cycle.

Novel apparatus for carrying out the above-described process comprises one or more dissolving units equipped with means for feeding spent nuclear reactor fuel, in a controlled manner, to a particular member or members of the dissolving units. Each of the dissolving units comprises (a) a fluid-retaining main housing member open at one end and having a fluid inlet means at the opposite end, (b) a fluid-retaining recycle housing member open at one end which open end is connected to the open end of the fluid-retaining main housing member, the opposite end of the fluid-retaining recycle housing member being connected to the opposite end of the fluid-retaining main housing member, (c) means for circulating a dissolvent solution through the fluid-retaining main housing member to the fluid-retaining recycle housing and (d) means for withdrawing a portion of the dissolved fuel solution from the fluid-retaining recycle housing member. A removable perforated basketlike member is inserted in the fluid-retaining main housing member to receive and position the fuel for contact with the dissolvent solution. After dissolution is complete the basketlike member containing the leached hulls may be removed and replaced with an empty basket for another dissolution cycle. In a preferred embodiment, two dissolution units are employed.

INVENTOR.
ARNOLD L. AYERS

PLURAL SPENT-REACTOR-FUEL DISSOLVERS HAVING SELECTIVE FEED MEANS

This application is a continuation-in-part of U.S. application 718,175, filed Apr. 2, 1968, now abandoned.

BACKGROUND OF THE INVENTION

Nuclear reactor fuel elements become unusable after a period of time due to the buildup in the fuel during operation of the reactor, of a variety of fission products which serve as neutron absorbers or poisons for the reaction. Though unusable at such a time these fuel elements still possess a valuable quantity of fissionable fuel values as well as a variety of useful byproducts of the fission reaction. Accordingly, from an economic standpoint, it is necessary to recover these values. Reprocessing schemes for recovering these values generally involve treatment of solutions in which these values have been dissolved. Currently, nitric acid is by far the most widely used dissolvent for this purpose, although other dissolvents are known.

During the dissolution step a variety of volatile off-gases are evolved. These off-gases include radioactive materials such as iodine, xenon and krypton, as well as inorganic gases formed by the decomposition of dissolvent which in the case of nitric acid, for example, may include NO and $NO_2$. The uncontrolled evolution of these gases may overtax off-gas treatment facilities and produce dangerous situations, particularly when large quantities of radioactive off-gases are released within a short period of time. Government regulations control the maximum concentration of radioactive gases that may be released at a particular site within prescribed periods of time. Unless control is exercised over the release of the radioactive off-gases, the maximum tolerated concentration of these gases may quickly be reached, particularly where large installations are involved.

A variety of means have been devised to gain control over the evolution of the off-gases, particularly the radioactive off-gases, of these dissolution reactions. Control has been exercised chemically, for example, as described in U.S. Pat. No. 3,119,658 to Schulz. A variety of mechanical methods for the control of off-gas evolution during dissolution of nuclear reactor fuels have been attempted. None have met with complete satisfaction, particularly when it is attempted to apply such methods for use in large installations. For example, it has been attempted to effect a control of off-gas evolution by adding dissolvent, in controlled amounts, to the fuel. It was found, however, that under such an arrangement dissolution of the fuel still takes place and that even with very small quantities of dissolvent, large quantities of off-gases are released within a short period of time. This is particularly true in nitric acid systems. Moreover, when nitric acid is used as the dissolvent and added incrementally to the fuel, polymerization of plutonium values takes place. The plutonium polymer can be made to dissolve in nitric acid only with extreme difficulty, and, accordingly, the dissolution efficiency of the operation is substantially diminished.

SUMMARY OF THE INVENTION

It is an object of this invention to provide an effective semicontinuous or continuous process for the dissolution of spent nuclear reactor fuel elements which simultaneously affords a means for controlling the amounts of volatile off-gases evolved during the dissolution.

It is a particular object of the invention to provide a method as described above which is particularly applicable to nitric acid dissolution of nuclear power reactor fuels, especially uranium oxide and plutonium oxide, and which effectively controls the evolution of radioactive off-gases during the dissolution, especially krypton.

Another object of the invention is to provide novel apparatus to effectively carry out the above noted objects which is simple in construction and operation and which requires a relatively low capital investment.

Other objects of the invention will become apparent from the following description.

In accordance with the procedural aspects of the invention it has been found that the objects of the invention may be accomplished by carrying out the dissolution of spent nuclear fuel elements in the following manner. The spent nuclear fuel is passed, in a controlled manner, into a dissolvent solution. The volatile off-gases which are formed are continuously withdrawn from the system. A portion of the solution of dissolved spent nuclear reactor fuel is withdrawn from the system when a predetermined maximum concentration of fuel values is reached in the solution. A compensating volume of dissolvent solution is added to the system while withdrawal of product solution is taking place. The remaining portion of the solution of spent nuclear reactor fuel is continuously recirculated to the dissolution step. When a predetermined minimum concentration of fuel values in the solution is reached due to dilution with the added dissolvent solution, withdrawal of product solution and addition of dissolvent solution is discontinued and the concentration of the fuel values in the solution is allowed to build up to the predetermined maximum amount. This process is repeated until complete dissolution of all fuel charged is accomplished. A plurality of dissolving systems may be employed, each of which operates substantially as described above. Spent nuclear reactor fuel may be charged to some of the dissolving systems and dissolution carried out while the other dissolving systems are being prepared for dissolution cycles. If a single dissolving system is employed it may be operated in a continuous fashion until it can no longer tolerate any additional charge of fuel. At this point dissolution is stopped, the leached hulls are discharged from the system and the system is readied for another dissolution cycle. This mode of operation will be termed "semicontinuous" herein. Preferably, two dissolving systems are employed, with dissolution taking place in one system with the other system being prepared for dissolution. With this arrangement dissolution can be carried out around the clock and this mode of operation will be termed "continuous" herein.

In accordance with the structural aspects of the invention it has been found that the objects of the invention may be accomplished by carrying out the procedures described above in apparatus which comprises a plurality of dissolving units equipped with means for feeding spent nuclear reactor fuel, in a controlled manner, to a dissolving unit or to a particular member or members of the dissolving units, each of which dissolving units comprises: (a) a fluid-retaining main housing member open at one end and having a fluid inlet means at the opposite end, (b) an access opening in the fluid-retaining main housing member to permit the semicontinuous or continuous feeding of spent nuclear reactor fuel therethrough, (c) a fluid-retaining recycle housing member open at one end which open end is connected to the open end of the fluid-retaining main housing member, the opposite end of the fluid-retaining recycle housing member being connected to the opposite end of the fluid-retaining main housing member, (d) means for circulating a dissolvent through the fluid-retaining main housing member to the fluid-retaining recycle housing member and back to the fluid-retaining main housing member, and (e) means for withdrawing a portion of the dissolved fuel solution from the fluid-retaining recycle housing member. In a preferred mode, a removable perforated basketlike member is situated within the fluid-retaining main housing member of each dissolving unit and is adapted to support the divided spent nuclear reactor fuel for contact with the dissolvent. These removable basketlike members facilitate removal of the leached hulls, washing of the unit and preparation of the dissolving unit for the next dissolving cycle. In a preferred embodiment, two dissolving units are employed and a common reactor fuel feeding means is employed for both dissolving units.

DETAILED DESCRIPTION OF THE INVENTION AND OF THE PREFERRED EMBODIMENTS

Figure 1:
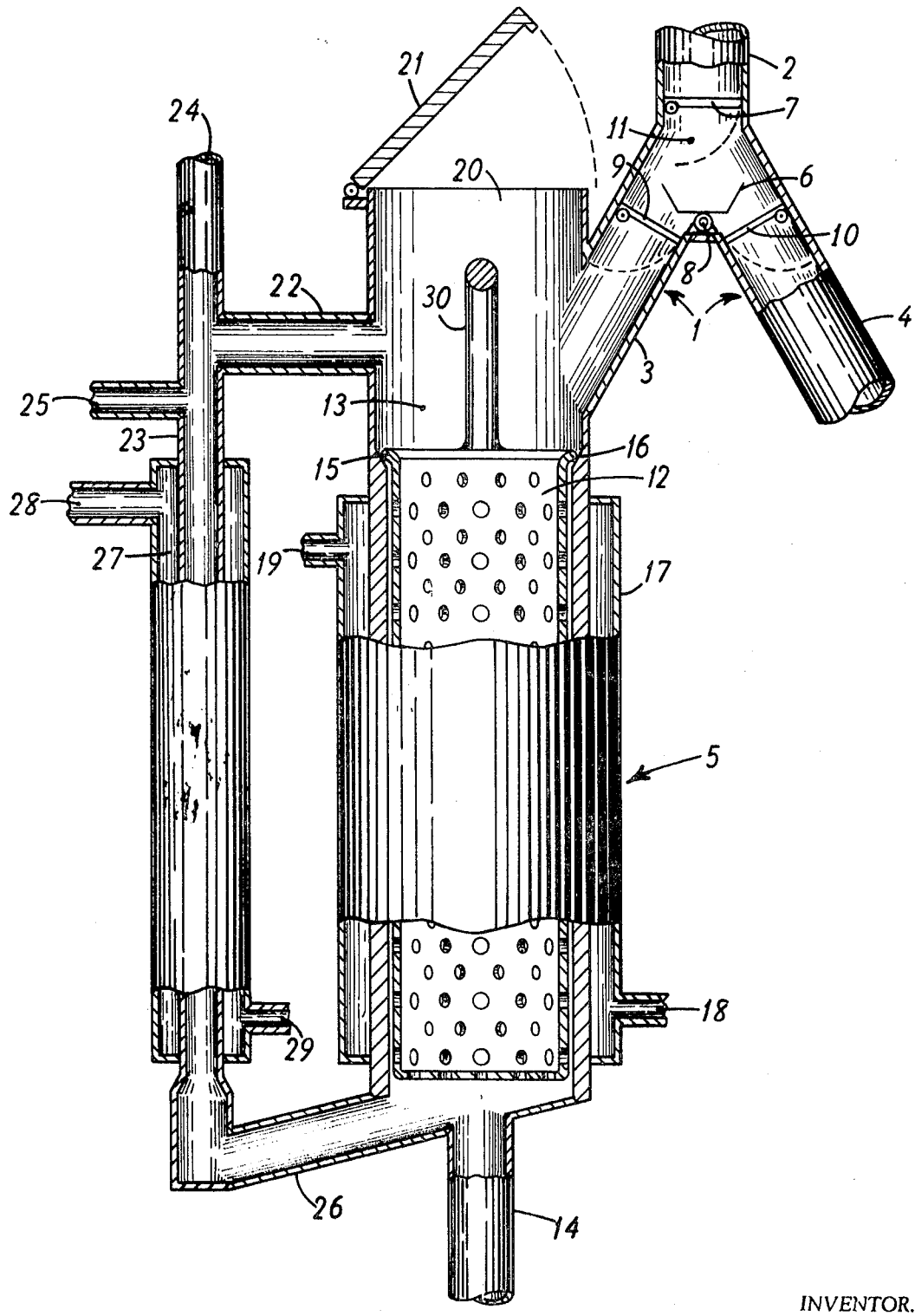
FIG. 1 is an elevation, in partial section, of the preferred embodiment of the apparatus of this invention and shows a twin dissolving unit with one unit cut away, together with the preferred form of diverting means for the distribution of fuel material to the respective dissolving units. The cutaway dissolving unit is identical to the one shown and has been omitted to simplify the drawing.

The invention process and apparatus are applicable to the dissolution of a variety of nuclear fuel elements with a variety of dissolvent solutions. Spent nuclear reactor fuels derived from light water moderated and cooled reactors, gas cooled reactors, fast converters and thermobreeders are illustrative-type fuels which may be employed. The fuels may be power-type fuels from power stations or nonpower-type fuels from test and research reactors. Illustrative candidate power fuel materials include the common metallic-oxide-type nuclear reactor fuels such as uranium oxide ($UO_2$), plutonium oxide ($PuO_2$) and mixed uranium oxide/plutonium oxide or uranium oxide/thorium oxide ($ThO_2$) fuels. Carbides or alloys of uranium, plutonium and thorium or of other fissile and fertile materials are also suitable. Illustrative suitable fuels from test and research reactors include plates of $UO_2$, uranium metal, uranium carbide, alloys of uranium and aluminum, alloys of zirconium and uranium, uranium nitrides, uranium hydrides and similar compounds of Pu. Other fuel elements suitable for use in accordance with the invention include uranium or plutonium type elements in combination with niobium and/or graphite, CaO, Si compounds and other inert metals. Still other fuel materials suitable for use in accordance with the invention will readily occur to those skilled in the art.

The type of cladding associated with the element of the particular fuel which is to be treated is not critical. It may include, for example, zirconium, alloys of zirconium, stainless steel, aluminum and other metals. It is preferred, however, that the cladding associated with the fuel to be dissolved be inert to the dissolvent to be employed. This facilitates separation of the desired values from the dissolved fuel solution.

For reasons indicated above, the nature of the dissolvent is not critical but nitric acid is preferred. With certain types of fuels, however, it may be desirable to incorporate additional ingredients with the dissolvent to achieve special purposes. For example, in the case of mixed $UO_2/ThO_2$ fuel which is not readily dissolved by concentrated $HNO_3$ alone, it is desirable to add NaF to the $HNO_3$ dissolvent since fluoride ion in combination with $HNO_3$ promotes dissolution of this type of fuel. Uranium-molybdenum-alloy-type fuels generally require the addition of a source of ferric ion, e.g. $Fe(NO_3)_3$, in order to promote dissolution. HF is generally added to $HNO_3$ dissolvent when zirconium-uranium-alloy-type fuels are treated. However, if the ratio of uranium to zirconium is low, HF may be the dissolvent or small quantities of $HNO_3$ may be added to the dissolvent. Mercuric nitrate catalyzes the nitric acid dissolution of aluminum-uranium-alloy-type fuels.

In accordance with standard procedures, soluble neutron poisons such as boric acid, cadmium nitrate, gadolinium nitrate, or any other material which has a high neutron absorption cross section, may be added to the dissolvent to allow the amount of fissile material in the dissolver to exceed the nominal critical quantity without causing the system to become critical.

For the reasons given above, it is to be stressed that neither the procedural nor structural aspects of this invention are to be limited by the type of fuels dissolved, the type of dissolvent used, or by any additive which may be added to the system to achieve special purposes. It should be kept in mind, however, that chemicals added to the fuel or dissolvent constitute contamination which must ultimately be removed, thereby complicating the recovery system.

The fuel elements to be treated may vary substantially in size as used in the nuclear reactor. Nonpower-type fuel elements may be used in lengths as small as 18 inches and below whereas power-type fuel elements are often in the range of about 10—14 feet in length. Although, virtually any size fuel element can be treated in accordance with this invention providing appropriately sized equipment is employed, it is usually preferred to divide the fuel elements into smaller pieces to facilitate handling and to expedite the dissolution. This may be accomplished by any conventional means such as shearing units which cut the fuel elements into small pieces. The divided fuel elements are then treated in accordance with the invention. Some types of fuel elements, such as those comprising a perforated graphite matrix filled with fuel values, could be crushed to form a more suitably sized fuel feed. The invention will be particularly described with reference to a shearing step for the fuel elements and more particularly to the use of a single shear and twin dissolver units for continuous operation. From the above discussion it will be clear that this is illustrative only and is not to be taken as a limitation on the invention. Separate shears could be employed for each dissolving unit or none at all for that matter. Semicontinuous operation could be carried out in a single dissolver unit.

With reference to FIG. 1, 1 is a diverting valve which receives chopped or sheared fuel elements from a shear (not shown) through stem 2 and diverts the chopped fuel elements through leg 3 or leg 4 of the diverting means. Legs 3 and 4 transport the chopped fuel elements to twin dissolving units. Only the dissolving unit which is connected to leg 3 is shown and is designated 5.

The chopping or shearing unit is conventional and is not a part of this invention. It may be operated manually or by automatic hydraulic power and serves to chop or shear the fuel elements into preselected lengths suitably in the range of about 1–3 inches. The length of the chopped pieces of fuel element is not critical but dissolution rates will vary with the length of the pieces depending on the extent of burnup of the fuel. The lesser the burnup, the lower will be the dissolution rate and size of the cuts of the fuel element can be reduced accordingly to increase dissolution rates. The optimum size of the cut for a particular fuel and a specified burnup can be readily ascertained by routine experimentation.

Figure 2:
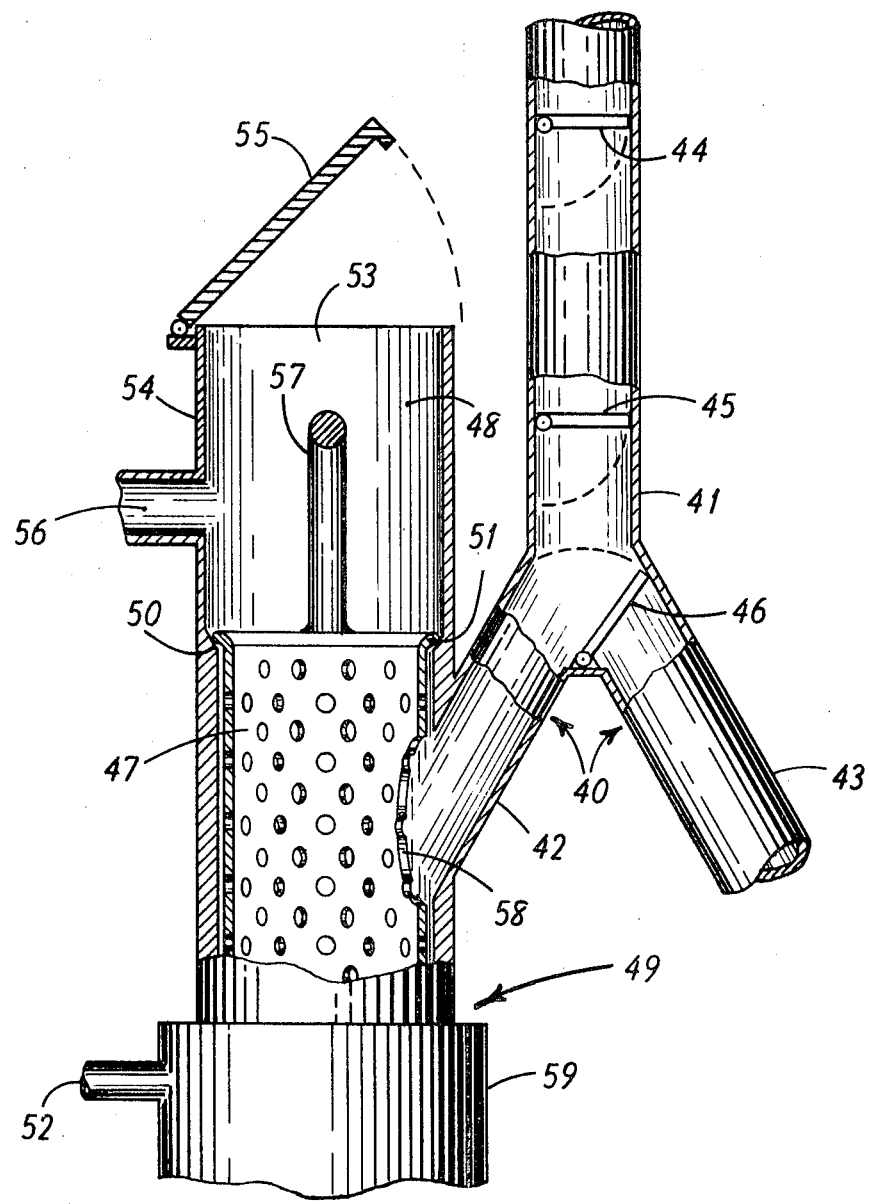
FIG. 2 is a cutaway, in partial section, showing an alternate form of diverting means to one dissolving unit of a twin dissolving unit system. As in FIG. 1, one complete dissolving unit has been cut away. Additionally, only a portion of the remaining dissolving unit is shown, which demonstrates an alternate mode of connecting the diverting means to the dissolving unit.

The particular structure of the diverting means is not critical. The only critical requirement for the diverting means is that it provides a means for regulating the flow of chopped fuel to the respective dissolving units. This may be accomplished by providing flapper valves which can be used to permit or prevent flow of chopped fuel to the dissolving units. The rate of addition of chopped fuel to a dissolving unit in which dissolution is taking place is regulated to maintain control of the dissolution to avoid peaking or an undesirably large evolution of off-gases within a short period of time. In a preferred embodiment, when two dissolving units are employed, the diverting means is designed so that when flow of chopped fuel is taking place to one dissolving unit, flow of chopped fuel cannot take place to the other dissolving unit and vice versa. In a still preferred embodiment, means is provided to close access to the transport piping leading to the shearing unit so that after a charge of chopped fuel is fed to a dissolving unit, evolved off-gases from that unit are prevented from escaping through the transport piping to the shearing unit. The preferred structure of the diverting means is shown in FIG. 1 and an alternate structure is shown in FIG. 2. The preferred structure of FIG. 1 shows a bucketlike member 6, which is situated in coaxial alignment below stem 2 so that chopped fuel element material which drops through stem 2 falls into bucketlike member 6. The impact of the fall of chopped fuel is thus buffered by bucketlike member 6. Flapper unit 7 controls the feed of chopped fuel from stem 2 to bucketlike member 6. Bucketlike member 6 is mounted on a pivot point 8 which permits it to be tilted to either side thereby dumping the contents of the bucketlike member either into leg 3 or leg 4. After dumping, bucketlike member 6 is returned to an upright position and is ready to receive another cut of fuel. The instrument controls for tilting the bucketlike member are not shown. Such are within the skill of the art. Flapper units 9 and 10 control access from chamber 11 containing bucketlike member 6 to legs 3 and 4, respectively. Chopped fuel material which is permitted access to leg 3 falls into perforated basketlike member 12 which is positioned inside of fluid-retaining main housing member 13 of dissolving unit 5. Basketlike member 12 contains a lip 15 which rests on shoulder 16 of dissolving unit 5 to support this member. After a controlled amount of chopped fuel has been fed to dissolver unit 5, flapper unit 9 is closed to prevent off-gases from the dissolving unit to escape through the diverting means. Since a small amount of evolved off-gases will invariably escape into chamber 11 of the diverting means 1 upon initial contact of the chopped fuel with the dissolvent in dissolving unit 5 before there is opportunity to close flapper unit 9; flapper unit 7 is closed after charging bucketlike member 6 with a cut of fuel before dumping takes place into leg 3. Chamber 11 may be purged by any suitable means such as a steam purge (not shown in the drawing).

Dissolvent is charged or added to the system through pipe 14. At startup, dissolvent is charged to the system in an amount to provide a sufficient liquid level in the dissolving unit and perforated basketlike member 12 to effectively contact the chopped fuel pieces dropped in the basketlike member.

Conditions maintained in the dissolving unit will vary depending upon the type of fuel, the type of dissolvent and the type of additive present. In the case of uranium oxide fuel and nitric acid dissolvent, for example, dissolution temperatures will range between about 50–120° C., and will preferably be at least about 90° C. The particular dissolution conditions in the situation involved, such as temperature and concentration of dissolvent employed, are strictly conventional and do not form a part of this invention. Generally, when nitric acid is used as dissolvent, a 6–13M solution may be employed as charge to the dissolver and more usually as a 7–9M solution. During the dissolution cycle, at equilibrium, $HNO_3$ dissolvent will gradually assume a concentration of 1–7M or more usually a concentration of 2–3M.

Temperature conditions in the main housing member 13 and basketlike member 12 of the apparatus may be maintained by providing any suitable heat exchange means around a portion of the main housing member, such as water jacket 17, equipped with the usual inlet and outlet means 18 and 19, as shown in the drawing. This function may be accomplished by other methods, however, for example, by heating coils or wires wrapped around a suitable length of the main housing member. An alternate way of controlling temperature is to heat or cool only the recycle housing member thereby eliminating the need for main housing member water jacket 17. If desired, heat exchange means may be provided along portions of both the main housing member 13 and recycle housing member 23.

The optimum amounts of neutron poisons to be incorporated with the dissolvent, if employed, may be readily determined by one of ordinary skill in the art. The optimum amounts will depend on reactor design and criticalities of the fissionable material present and are within conventional knowledge and do not form a part of this invention. Generally, if boric acid is to be used as a poison together with nitric acid, for example, about 1–20grams/liter of boric acid/nitric acid may be effectively employed.

The solution of dissolvent and dissolved fuel elements, together with volatile off-gases which are produced, are forced upwardly through the apparatus by virtue of the pressure differential which is built up in the system. A removable cover or lid portion 21 is provided to seal off the fluid-retaining main housing member 13 from gas evolution during dissolution. The dissolved solution and off-gas mixture then passes through upper connecting section 22 and from there into fluid retaining recycle member 23. Optionally, but preferably, a screen (not shown in the drawing) is provided at the entrance to the upper connecting section to screen out particles of fuel or particles of leached hulls thereof which otherwise may be carried over into the recycle housing member 23, thereby presenting a difficult problem of removal. The off-gases entering recycle housing member 23 are vented off through the open top of the recycle housing member at 24 and are further processed in a conventional manner such as by scrubbing, iodine removal, filtering and eventual discharge to the atmosphere. The dissolved fuel solution drops down into the body portion of recycle housing member 23 and is available for recirculation or takeoff as needs dictate, as will be explained in more detail hereinafter.

In the preferred mode of operation, at startup of the dissolver, chopped fuel is fed to the dissolving unit which has already been charged with the desired amount of dissolvent solution.

A pressure differential is created in the system by maintaining a portion of recycle housing member 23 at a temperature lower than the temperature maintained in main housing member 5. This may be accomplished by any conventional heat exchange means such as cooling jacket 27 equipped with the usual inlet and outlet means 28 and 29, respectively. Equivalent heat exchange means may readily be devised. Gas evolved during dissolution or inert gas added to the main housing member 13 through inlet 14 may also be used to create a pressure differential for recirculation. This pressure differential provides a circulating means for the solution in the dissolver unit. After a predetermined amount of the sought-for fuel values has gone into solution, as may be ascertained by continuous testing with routine equipment, a portion of the product solution is withdrawn from recycle housing member 23 through outlet 25. The concentration of the product solution withdrawn is selected to subsequent needs of the reprocessing scheme which is designed to recover fuel values from this solution, for example, by conventional solvent extraction methods which are not a part of this invention. Ordinarily, the product solution is withdrawn at a concentration which is somewhat greater than that which is required for subsequent treatment. It may be readily diluted for use as required. The remaining portion of the product solution which is not withdrawn, is recirculated as described above to the dissolution step. The recycling or recirculating is a critical part of the invention process. The recycling step serves to avoid the danger of reducing the acidity in the dissolver to the point where undesirable polymerization of plutonium values takes place. The recycling step also serves to agitate the dissolvent solution in the dissolver, thereby simplifying the apparatus design.

In order to compensate for the volume of product solution withdrawn through outlet 25, a like volume of fresh dissolvent solution is fed into main housing member 13 through inlet 14. When this is done, the fuel values in the dissolvent solution will be diluted and the fuel value concentration will go down. When the concentration of the fuel values reaches a preselected minimum value, depending on considerations relating to concentrations of fuel values desired for subsequent reprocessing, as described above, product solution withdrawal is stopped as well as compensating dissolvent addition, and dissolution of the fuel is allowed to proceed. Eventually, the concentration of the fuel will reach its preselected maximum value, whereupon product solution is again withdrawn and additional dissolvent is provided. This cycle is repeated until all the fuel values have been extracted from all the chopped spent fuel material which can be added to the dissolving unit.

The optimum proportion of product solution to be withdrawn to the amount of product solution recycled will depend on a variety of factors such as type of fuel dissolved, the extent of enrichment of the fuel, the extent of burnup of the fuel, the type of dissolvent employed and the desired concentrations of dissolved fuel values in the product solution for subsequent processing, as described above. The best proportion to use in a particular case may readily be determined by anyone skilled in the art based upon these and other obvious considerations with routine experimentation.

After the dissolution cycle is complete or substantially complete in dissolving unit 5, chopped fuel material is fed into bucketlike member 6 of diverting means 1 and is diverted through leg 4 to the twin dissolving unit connected thereto. Dissolving unit 5 may then be prepared for an additional dissolution cycle. The leached hulls in basketlike member 12 may be washed in situ with fresh acid and water. Access to basketlike member 12 is obtained by opening removable cover or lid member 21. The basketlike member containing the washed leached hulls may be monitored to determine if significant residual fuel values are contained therein in which case the hulls are retreated to recover the same, or if no significant residual fuel values are present, the basketlike member 12 is lifted out of main housing member 13 with the aid of handle 30 and the leached hulls contained therein treated and disposed of in a conventional manner. At this point, dissolver unit 5 is ready for loading with an empty basketlike member and for an additional dissolving cycle. When a dissolution cycle is completed in the twin dissolver unit, that unit can be prepared and recharged for an additional cycle while dissolving unit 5 can be operated. In this manner an effective continuous around-the-clock dissolution process is achieved.

Material of construction of the apparatus should be of a metal which is inert to the action of the dissolvent employed. Stainless steel is a suitable construction material when nitric acid is employed.

FIG. 2 shows an alternate form of diverting means and an alternate means of tying the same into the dissolving units. Referring to FIG. 2, 40 is the alternate diverting means, 41 is the stem and 42 and 43 are the legs, which parts are analogous to those in the diverting means shown in FIG. 1. Flapper unit 44 controls the flow of chopped fuel elements from the shear through stem 41. Another flapper unit 45 in the stem, when closed, serves as a buffer for the fall of chopped fuel material analogous to the buffer provided by the bucketlike member 6 in the diverting means of FIG. 1. After a cut of fuel is dropped onto flapper unit 45, flapper unit 44 may be closed. Diverting flapper unit 46 can then be positioned to one side or the other to divert the chopped fuel, when dropped, into either leg 42 or leg 43. When flapper unit 45 is opened, permitting the chopped fuel to drop into one of the legs 42 or 43 of the diverting means, closed flapper unit 44 serves to block the escape of evolving gas from the dissolving unit which is then in communication with stem 41, into the stem. With the position of diverting flapper unit 46 shown in the drawing, the dropped fuel material will be fed through leg 42 directly into basketlike member 47 of main housing member 48 of dissolving unit 49. As may be seen in FIG. 2, basketlike member 47 has an opening 58 in its side which directly connects to leg 42 of the diverting means. Otherwise, dissolving unit 49 is wholly analogous to the dissolving unit 5 of FIG. 1. The parts in FIG. 2 which are analogous to similar parts shown in FIG. 1 are lip 50, shoulder 51, water jacket 59, water jacket outlet 52, open top 53 of main housing member 54, removable top member 55, upper connecting member 56 and handle 57.

In a typical operation carried out in apparatus as described in FIG. 1, spent $UO_2$ fuel elements, clad with "Zircaloy," from a typical light water cooled and moderated reactor, are sheared into 2-inch pieces and a cut ranging between about 25–50 lbs. is dropped into bucket member 6 which has a capacity of about 100 lbs. Stem member 2 and leg member 3 have diameters of about 16 inches. Dissolving unit 5 is charged with a nitric acid dissolvent solution containing boric acid to a level which reaches about three-fourths the height of basket member 12. Basket member 12 has a diameter of about 25 inches and is 5 feet high. Flapper units 7 and 10 are closed, flapper unit 9 is opened and bucket member 6 is tilted to discharge its contents of chopped fuel into basket member 12. Upon contacting the acid solution, the soluble components in the fuel begin to dissolve and gaseous off-products are released. When the uranium concentration in the solution reaches about 275–300 gms./liter, product solution is withdrawn through outlet 25. At the same time an equivalent volume of nitric dissolvent solution containing boric acid is fed into the dissolver through inlet 14. When the concentration of uranium in the solution falls to about 250 gms./liter, withdrawal of product is stopped as well as addition of nitric acid and boric acid solution. Periodically, additional cuts of chopped fuel are dropped into basketlike member 12. These cuts are added in an amount and at a rate such that the release of gaseous products is spread more or less evenly over a period of about 5–9 hours. This may be accomplished by feeding in cuts containing 25–50 lbs. of chopped fuel material with about 5–10 minutes allowed in between cuts. After all these cuts have been added, dissolution is continued for a period of about 3–4 hours. During this final dissolution period, particularly in the latter stages, chopped fuel material may be charged to the twin dissolver unit and dissolution commenced therein. After the final dissolution period, dissolution unit 5 may be prepared for another cycle. This is accomplished by draining the dissolution unit and charging the unit with fresh acid solution to dissolve any residual fuel present. This acid solution is then drained and the dissolution unit is filled with water to rinse out residual acid. The water is then drained from the unit and the unit is purged with steam. Lid member 21 is then opened and the basked containing leached hulls is removed. The basket is then monitored to detect the presence of any residual fissile material in which case it is returned to a dissolving unit for further treatment or, if no significant amount of residual fissile material is present, the leached hulls are removed, treated and disposed of in a conventional manner.

It will be apparent to anyone skilled in the art that a variety of modifications and variations may be made to the novel process and apparatus described herein without departing from the scope and spirit of the invention. For example, the apparatus may be equipped with detectors to provide a warning when criticality limits are approached. Means can be provided to admit a gas to the bottom of the dissolver units to provide auxiliary mixing if it becomes desirable to do so. Screens and filters may be provided to control the passage of solid particles throughout the system. Steam jets may be provided to empty liquids from the dissolving units. Steam or other gases may be used for purging the diverting means unit. The basketlike members may be partially perforated in lieu of being fully perforated to influence dissolution rates. Recovery and recirculating equipment for used dissolvent may be associated with and tied into the subject apparatus. A multitude of instrumentation lines and associated equipment may be provided to control the various flapper units, to measure the concentrations of fuel values in the dissolvent product solution, to maintain liquid levels and for other purposes. Many obvious modifications and refinements readily occur to those skilled in the art. Accordingly, the invention is to be limited only by a reasonable interpretation of the scope of the appended claims.

I claim:

1. Apparatus for dissolving spent nuclear reactor fuel which comprises, in combination, a plurality of dissolving units equipped with means for feeding spent nuclear reactor fuel, in a controlled manner, to a selected one of said units which dissolving units each comprise in combination:

a. a fluid-retaining main housing member open at the top end and having a fluid inlet means at its lower end, b. an access opening in the upper portion of said fluid-retaining main housing member to permit the feeding of spent nuclear reactor fuel therethrough, c. a fluid-retaining recycle housing member open at its upper end and connected at a point below said open upper end to the upper side portion of the fluid-retaining main housing member, the lower end of the fluid-retaining recycle housing member being connected to the lower end of the fluid-retaining main housing member, d. means for recirculating a dissolvent liquid upwardly through the fluid-retaining main housing member to the fluid-retaining recycle housing member, downwardly through said recycle housing member, and back to the fluid-retaining main housing member, e. means for withdrawing a portion of the dissolved fuel solution from the fluid-retaining recycle housing member, f. a removable perforated basketlike member situated within the fluid-retaining main housing and adapted to support the spent nuclear reactor fuel which is to be dissolved; and in which the means for feeding spent nuclear reactor fuel, in a controlled manner, to said dissolving units comprises, in combination:

a. a stem member adapted to receive and convey spent nuclear reactor fuel from a source thereof,
   b. a plurality of legs protruding from the stem member and in communication therewith, each of said legs being connected to one of the access openings in said fluid-retaining main housing members of the dissolving units and being adapted to convey spent nuclear fuel from said stem member into the respective dissolving units,
   c. a bucketlike member located coaxially below the stem member, said bucketlike member being adapted to receive the discharge of spent nuclear fuel which takes place through the stem member, said bucketlike member being further adapted so that can be controlled to tilt to any one of said legs thereby dumping spent nuclear fuel which has accumulated in the bucketlike member into said anyone of said legs protruding from the stem member, and
   d. disengageable closure members in each of the stem and leg members capable of controlling the passage of solid and gaseous material therethrough.

2. Apparatus according to claim 1 possessing two dissolving units in which apparatus the means for feeding the fuel to one dissolving unit or the other is constructed so that the feed of fuel can take place to one but not both of the dissolving units at any given time.

3. Apparatus according to claim 1 in which removable closure means are provided to afford a gas tight seal for the open ends of the fluid-retaining main housing members of the dissolving units when in operation.

4. Apparatus according to claim 1 in which heat exchange means are provided along a portion of each fluid-retaining main housing member and along a portion of each fluid-retaining recycle housing member.

5. Apparatus according to claim 4 which includes, in combination, a means for feeding spent nuclear fuel, in a controlled manner, to the dissolving units which comprises, in combination:

a. a stem member adapted to receive and convey divided fuel from a source thereof,
   b. two legs protruding from the stem member and in communication therewith, each of which legs is connected to one of the access openings in the fluid-retaining main housing members of the dissolving units and is adapted to convey divided fuel from the stem into the respective dissolving units,
   c. a bucketlike member located coaxially below the stem member which bucketlike member is adapted to receive the discharge of divided fuel which takes place through the stem member, which bucketlike member is further positioned on a pivot point and adapted so that it can be controlled to tilt to one side or the other thereby dumping divided fuel which has accumulated in the bucketlike member into one or the other legs protruding from the stem member, and
   d. disengageable closure members on each of the stem and leg members capable of controlling the passage of solid or gaseous material therethrough.

6. Apparatus according to claim 5 which includes heat exchange means along a portion of each fluid-retaining main housing member and along a portion of each fluid-retaining recycle housing member.

7. Apparatus according to claim 6 which includes, in combination, a removable closure means to provide a gas tight seal for the open ends of the fluid-retaining main housing members of the dissolving units when in operation.

8. Apparatus according to claim 1 which includes, in combination, the following:

a. a removable closure means to provide a gastight seal for the open ends of the fluid-retaining main housing members of the dissolving units when in operation, and
   b. heat exchange means along a portion of each fluid-retaining main housing member and along a portion of each fluid retaining recycle housing member.

9. Apparatus for dissolving spent nuclear fuel which comprises, in combination a pair of dissolving units equipped with means for feeding spent nuclear fuel, in a controlled manner, to either one of said dissolving but not both dissolving units at any given time which dissolving units each comprise in combination:

a. a fluid-retaining main housing member open at the top end and having a fluid inlet means at its lower end,
   b. an access opening in the upper portion of said fluid-retaining main housing member to permit the feeding of spent nuclear reactor fuel therethrough,
   c. a fluid-retaining recycle housing member open at its upper end and connected at a point below said open upper end to the upper side portion of the fluid-retaining main housing member, the lower end of the fluid-retaining recycle housing member being connected to the lower end of the fluid-retaining main housing member,
   d. means for recirculating a dissolvent liquid upwardly through the fluid-retaining main housing member to the fluid-retaining recycle housing member, downwardly through said recycle housing member, and back to the fluid-retaining main housing member,
   e. means for withdrawing a portion of the dissolved fuel solution from the fluid-retaining recycle housing member,
   f. a removable perforated basketlike member situated within the fluid-retaining main housing and adapted to support the spent nuclear reactor fuel which is to be dissolved;

and in which the means for feeding spent nuclear reactor fuel, in a controlled manner, to said pair of units comprises in combination:

a. a stem member adapted to receive and convey spent nuclear reactor fuel from a source thereof,
   b. a pair of leg protruding from said stem member and in communication therewith, each of said legs being connected to one of the access openings is said fluid-retaining main housing members of the dissolving units and being adapted to convey spent nuclear fuel from said stem member into the respective dissolving units,
   c. a pair of disengageable closure members in the stem member, each of which closure members being independently capable of controlling the passage of solid and gaseous material therethrough, and
   d. a diverting flapper member located at the juncture of the leg members and affixed on a pivot point such that said flapper member can be positioned to control the passage of solid and gaseous material through either of the leg members, but not both of leg members simultaneously.

10. Apparatus according to claim 9 in which heat exchange means is provided along a portion of both the main housing and recycle housing members.